(12) United States Patent
Randall (10) Patent No.: US 11,673,493 B1
(45) Date of Patent: Jun. 13, 2023

(54) CHILDREN'S CAR SEAT ADAPTER

(71) Applicant: Steven J. Randall, Las Vegas, NV (US)

(72) Inventor: Steven J. Randall, Las Vegas, NV (US)

( * ) Notice: Subject to any disclaimer, the term of this patent is extended or adjusted under 35 U.S.C. 154(b) by 0 days.

(21) Appl. No.: 17/391,756

(22) Filed: Aug. 2, 2021

Related U.S. Application Data (60) Provisional application No. 63/059,565, filed on Jul. 31, 2020.

(51) Int. Cl.
  *B60N 2/28* (2006.01)
(52) U.S. Cl.
  CPC ......... *B60N 2/2806* (2013.01); *B60N 2/2821* (2013.01); *B60N 2/2881* (2013.01); *B60N 2/2863* (2013.01)
(58) Field of Classification Search
  CPC ... B60N 2/2806; B60N 2/2821; B60N 2/2881
  See application file for complete search history.

(56) References Cited

U.S. PATENT DOCUMENTS

| | | | |
|---|---|---|---|
| 3,707,008 A | 12/1972 | Fellin et al. | |
| 5,518,293 A | 5/1996 | Coy et al. | |
| 5,971,487 A | 10/1999 | Passehl | |
| 5,997,085 A | 12/1999 | MacLiver | |
| 6,000,753 A | 12/1999 | Cone, II | |
| 6,193,312 B1 | 2/2001 | Yoshida et al. | |
| 6,260,903 B1 | 7/2001 | Von der Heyde | |
| 6,827,400 B2 | 12/2004 | Menon et al. | |
| 7,029,069 B2 | 4/2006 | Hendren et al. | |
| 7,794,015 B1 | 9/2010 | Ashby | |
| 7,883,149 B1 | 2/2011 | Weiss et al. | |
| 8,113,584 B2 | 2/2012 | Boyle et al. | |
| 8,240,762 B2 | 8/2012 | Herzberg | |
| 8,444,221 B2* | 5/2013 | Strahm, Jr. ............... | B60N 2/75 297/250.1 |
| 9,580,031 B2 | 2/2017 | Kalis | |
| 10,189,380 B2 | 1/2019 | Decaluwe et al. | |
| 10,589,644 B2 | 3/2020 | Henseler et al. | |
| 2007/0108812 A1 | 5/2007 | Haun et al. | |
| 2008/0191530 A1 | 8/2008 | Basham | |
| 2014/0265484 A1 | 9/2014 | Elharar et al. | |
| 2019/0084523 A1 | 3/2019 | Finney | |

FOREIGN PATENT DOCUMENTS

| | | |
|---|---|---|
| DE | 19843870 | 3/2000 |
| DE | 102015110255 | 12/2016 |
| FR | 2559043 | 8/1985 |
| GB | 2490378 | 10/2012 |
| WO | 2008053214 | 5/2008 |

\* cited by examiner

*Primary Examiner* — Syed A Islam
(74) *Attorney, Agent, or Firm* — John Rizvi; John Rizvi P.A.—The Patent Professor®

(57) ABSTRACT

The present invention is directed to a children's car seat adapter for positioning two child's car seats near the center passenger area of a vehicles passenger seat. The children's car seat adapter includes a base plate for receiving a child's car seat and a latch anchor assembly for releasably securing the child's car seat to the base plate. The children's car seat adapter further includes a strap assembly for securing the base plate to the center passenger area of the vehicle's passenger seat.

19 Claims, 7 Drawing Sheets

CHILDREN'S CAR SEAT ADAPTER

CROSS-REFERENCE TO RELATED APPLICATIONS

This application claims the benefit of U.S. Provisional Patent Application No. 63/059,565, filed on Jul. 31, 2020, which is incorporated by reference herein in its entirety.

FIELD OF THE INVENTION

The present invention relates generally to children's car seats, and more particularly, to an adapter for use in securing children's car seats in the middle of a car's passenger seat.

BACKGROUND OF THE INVENTION

Transporting small children in a motor vehicle can be a dangerous situation. The risk of harm from impact and collision is greater to their small bodies than it is for larger children and adults. Special child car seats have been developed to deal with this situation by securing the child in an impact resistant seat secured to a vehicles passenger seat.

These child car seats are typically attached to special anchors provided in the vehicles passenger seats. More importantly, these anchors are positioned in the right and left passenger seat area adjacent the right and left side car doors. This places the child's car seat, and thus the child, close to the point of a side impact and subjects them to the force of the side impact as well as any shrapnel or broken glass that may be driven inward during the impact.

In some instances it may be possible to rig a single child's car seat near the center of the vehicles passenger seat by using individual connectors of both the right and left seat belt buckles or anchors if so provided. However, if a parent needs to transport two children in child's car seats, one of the child's car seats still needs to be in the dangerous position adjacent the right or left passenger door.

Furthermore, modern vehicles are equipped with side impact air bags positioned in the side doors and designed to protect adults by deploying inwardly at the moment of impact. However, the explosive deployment of these air bags can cause significant injury to the fragile body of a child again rendering the right and left passenger seats a very dangerous place to locate a child in a car seat.

Accordingly, there is need for a solution to at least one of the aforementioned problems. For instance, there is an established need for a children's car seat adapter that repositions the securing mechanisms for a child's car seat to the safer center passenger area of a vehicles passenger seat. There is still further an established need for a children's car seat adapter that accommodates two child's car seats in the safer center passenger area.

SUMMARY OF THE INVENTION

The present invention is directed to a children's car seat adapter for positioning two child's car seats near the center passenger area of a vehicles passenger seat. The children's car seat adapter includes a base plate for receiving a child's car seat and a latch anchor assembly for releasably securing the child's car seat to the base plate. The children's car seat adapter further includes a strap assembly for securing the base plate to the center passenger area of the vehicle's passenger seat.

In a preferred implementation of the invention, a children's car seat adapter for relocating a child's car seat to a safer center passenger area of a passenger seat of a motor vehicle is provided, the children's car seat adapter comprising:
  a generally rectangular mounting platform having a base plate;
  a latch anchor assembly for receiving a child's car seat, the latch anchor assembly having first set of latch anchors affixed to said base plate and including a first inner latch anchor and a first outer latch anchor and a second set of latch anchors affixed to said base plate and including a second inner latch anchor and a second outer latch anchor;
  and a strap assembly affixed to the base plate for securing the base plate to a vehicles passenger seat, the strap assembly having:
    a first set of strap members including a first inner strap member and a first outer strap member, the first inner and outer strap members terminating in connectors attachable to latch anchors of a vehicles passenger seat; and
    a second set of strap members including a second inner strap member and a second outer strap member terminating in connectors attachable to latch anchors of a vehicles passenger seat.

In a second aspect, the base plate is formed of a polymeric material.

In another aspect, the base plate is rectangular in shape.

In another aspect, the base plate includes top surface and a bottom surface defining a rear edge, and further wherein the base plate further includes a front edge and a first and second side edges.

In another aspect, the base plate includes clearance slots formed in the rear edge.

In another aspect, the top surface of the base plate includes a textured surface configured to prevent the car seat from sliding on the base plate.

In another aspect, the bottom surface of the base plate includes a flexible covering configured to assist the base plate in conforming to any uneven surfaces on the passenger seat.

In another aspect, the base plate includes a rigid supporting member located adjacent the rear edge of the base plate.

In another aspect, the rigid supporting member is attached to the first and second sets of latch anchors.

In another aspect, the base plate includes an internal stiffening frame separate from or connected to the supporting member.

In another aspect, the first and second inner and outer latch anchors are parallel to the first and second edge.

In another aspect, the first and second inner and outer latch anchors are parallel to the rear edge.

In another aspect, the strap assembly further includes cinch buckles associated with the first and second sets of strap members such that the first and second sets of strap members are threaded through the cinch buckles.

In another aspect, the cinch buckles are attached to the base plate.

In another aspect, the first and second sets of strap members pass through slots formed on the rear edge of the base plate.

In another aspect, the rear edge of the base plate includes clearance slots configured to provide clearance for projecting seat belt buckles and latches associated with the passenger seat.

In another aspect, the first and second set of latch anchors are fabricated from steel.

In another aspect, the first and second latch anchors have rounded corners.

In another aspect, the base plate is 40 inches wide.

In another aspect, the base plate is 18 inches deep.

In another aspect the base plate is one inch thick.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a car seat adapter which can position and secure a children's car seat near the middle or center of a vehicles rear passenger seat for safety.

Figure 1:
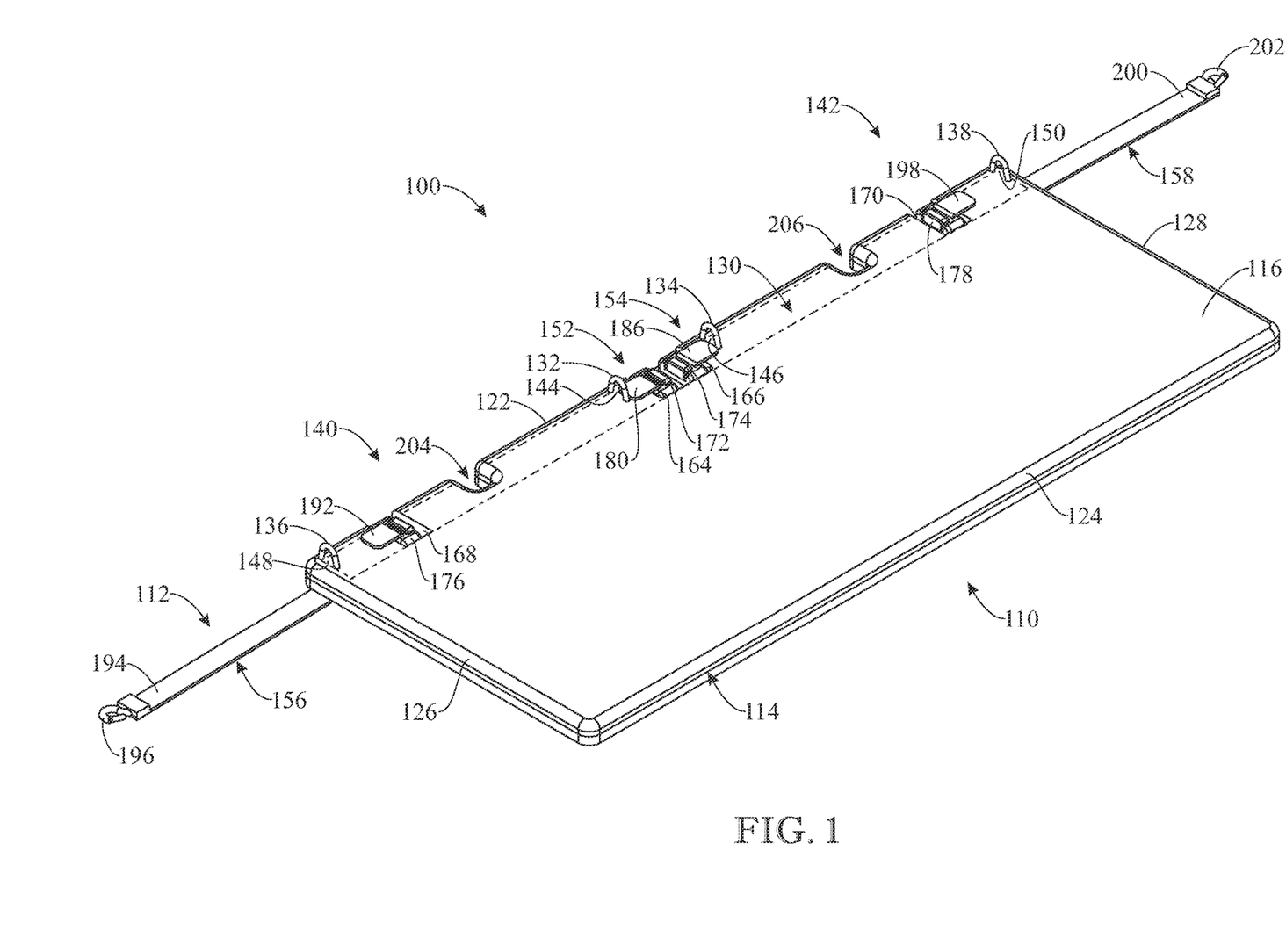
FIG. 1 presents a top, front isometric view of a children's car seat adaptor in accordance with an illustrative embodiment of the present invention.
Figure 2:
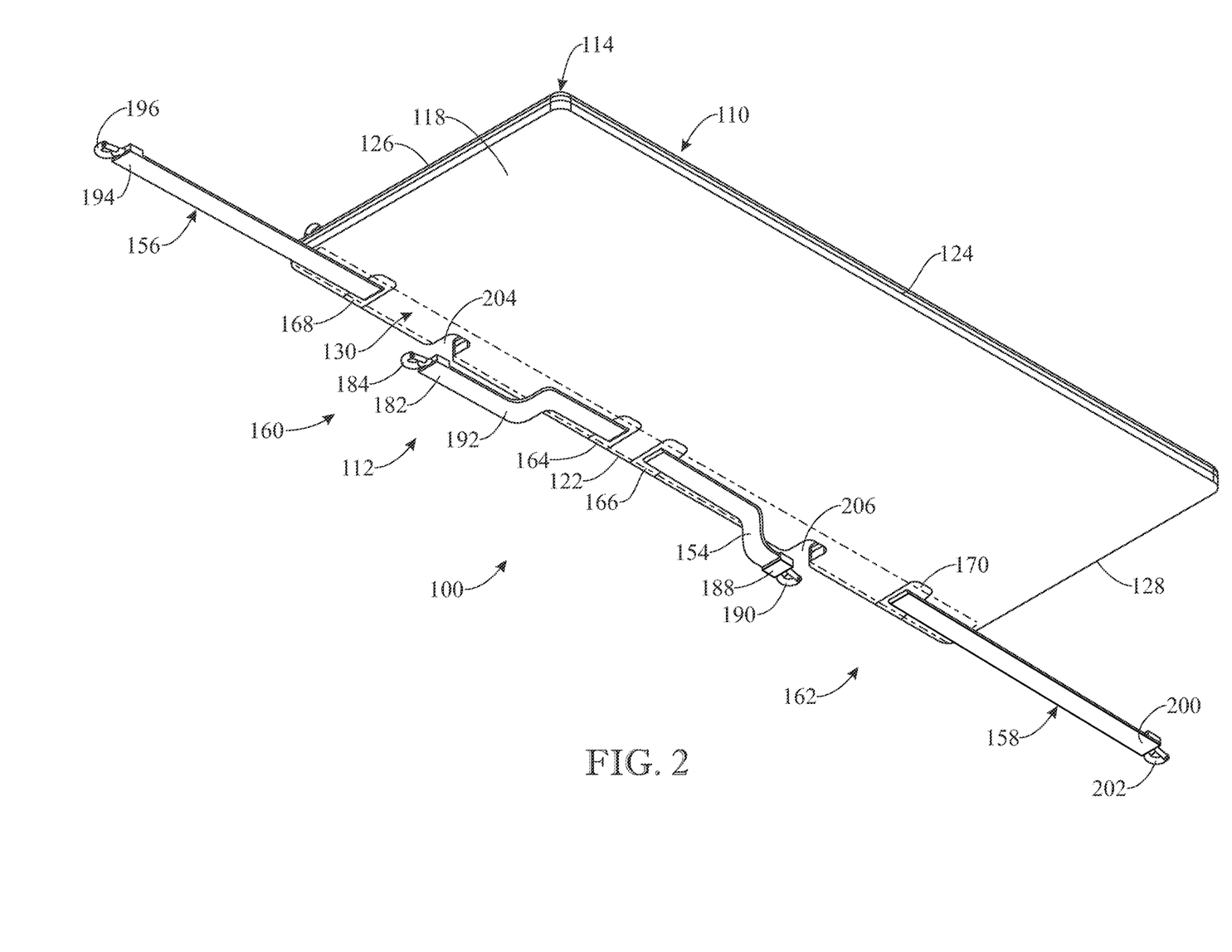
FIG. 2 presents a bottom, front isometric view of the children's car seat adaptor illustrated in FIG. 1.

Referring initially to FIGS. 1 and 2, a children's car seat adapter, hereinafter car seat adapter 100, is illustrated in accordance with an exemplary embodiment of the present invention. The car seat adapter 100 is designed to secure a children's car seat near the middle of a vehicles rear passenger seat and generally includes a mounting platform 110 to receive one or two children's car seats and a strap assembly 112 to secure the mounting platform 110 the vehicles rear passenger seat.

The mounting platform 110 includes a generally rectangular base plate 114 having a top surface 116 and a bottom surface 118. The mounting platform 110 additionally includes a latch anchor assembly 120 mounted to the top surface 116 of the base plate 114 and adjacent a rear edge 122 of the base plate 112 (FIG. 1). The latch anchor assembly 120 is provided to receive corresponding latch components of a children's car seat to secure the children's car seat to the plate 114 in a manner described hereinbelow. The strap assembly 112 is also mounted along the rear edge 122 of the base plate 114 and secured to the top surface 116 of the base plate 114 as described in more detail hereinbelow.

As noted above, the rectangular base plate 114 includes a top surface 116 and a bottom surface 118 and defines a rear edge 122. In addition to the rear edge 122 of the base plate 114, the base plate 114 further defines a front edge 124 and first and second side edges 126 and 128. The base plate 114 is formed of a flexible or semi-flexible material to absorb any impact or shock and conform to any irregularities in a surface of a vehicles passenger seat. The base plate 114 can be formed from a variety polymeric materials, such as, for example, ABS plastics, polypropylene, and the like. In a particular embodiment, the top surface 116 of the base plate 114 includes a textured or high friction surface to assist in preventing an attached children's car seat from sliding on the base plate 114 and the bottom surface 118 may be provided with a flexible covering or coating, for example a foam or memory foam coating, to assist the base plate 114 in conforming to any uneven surfaces or irregularities formed in or found on the vehicles passenger seat.

Preferably, the base plate 114 is formed from a polypropylene material and is reinforced to support and strengthen the latch assembly 120. For example, the base plate 114 may include a stiff supporting member 130 positioned within the rear edge 122 of the base plate 114 and attached to, or formed integrally with, the latch anchor assembly 120. The supporting member 130 may be also formed from a variety of stiff materials such as, for example, rigid polymeric materials, metallic materials, and the like. Preferably, the supporting member 130 is formed from a metallic material such as, for example, stainless steel and, more preferably, is formed integrally with the latch anchor assembly 120 to strengthen the latch anchor assembly 120. While not specifically shown, the base plate 114 may additionally include other stiffening members formed within the base plate 114 to strengthen the base plate 114 and support the children's car seats mounted thereon. For example, the base plate 114 may include an internal stiffening frame or frame members separate from, or connected to, the supporting member 130.

The latch anchor assembly 120 includes a plurality of latch anchor members to receive corresponding latches of a children's car seat. The latch anchor assembly 120 includes first and second inner latch anchors 132 and 134 and first and second outer latch anchors 136 and 138. The first inner and outer latch anchors 132 and 136, respectively, form a first set of latch anchors 140 for securing a first children's car seat near a middle of a vehicles passenger seat and the second inner and outer latch anchors 134 and 138 form a second set of latch anchors 142 for securing a second children's car seat near a middle of a vehicles passenger seat as described hereinbelow. The first and second inner latch anchors 132 and 134 and the first and second outer latch anchors 136 and 138 are formed as rigid loops defining respective latch or hook openings 144, 146, 148 and 150, respectively, which allow attachment of hooks or latches associated with a children's car seat.

The first and second inner and outer latch anchors 132, 134, 136 and 138 are preferably formed from an extremely rigid material such as, for example, rigid polymeric materials, metallic materials and the like. In a preferred embodiment, the disclosed latch anchors 13, 134, 136 and 138 are formed from a steel material and are incorporated into the stiffening member 130.

While the first and second inner and outer latch anchors 132, 134, 126 and 138, respectively, are shown oriented generally parallel to the first and second side edges 126 and 128, in a more preferred embodiment, the first and second inner and outer latch anchors 132, 134, 136 and 138 are oriented parallel to the rear edge 122. Additionally, while the disclosed latch anchors are illustrates as having fully rounded or oval shapes, in a preferred embodiment, the disclosed latch anchors 132, 134, 136 and 136 are generally rectangular and, more preferably, have rounded rather than sharp corners.

As noted above, the strap assembly 112 is provided to firmly and fixedly secure the mounting platform 110 to a vehicles passenger seat. Similar to the latch anchor assembly 120 the strap assembly 112 includes first and second inner strap members 152 and 154, respectively, and first and second outer strap members 156 and 158, respectively. The first inner and outer strap members 152 and 156 form a first set of strap members 160 for securing a first children's car seat to the base plate 114 and the second inner and outer strap members 154 and 158 form a second set of strap members for securing a second children's car seat to the base plate 114 in a manner described herein below.

The material used for the first and second sets of strap members 160 and 162, respectively, is of a type certified for use in vehicle seat belts. The first and second strap members 152 and 154 and the first and second outer strap members 156 and 158 are formed from a high strength webbing type material similar or identical to that used for a vehicles seat belts.

The first and second inner strap members 152 and 154 and the first and second outer strap members 156 and 158 extend through respective inner slots 164, 166 and outer slots 168 and 170 formed in the rear edge 122 of the base plate 114. Cinch buckles 172, 174, 176 and 178 are secured within or, preferably, on the top surface 116 of the base plate 114 adjacent to, the slots 164, 166, 168 and 170 and are provided to receive the first and second inner strap members 152 and 154 and the first and second outer strap members 156 and 158 to releasably secure them to the base plate 114. It should be noted that the inner slots 164 and 166 may be formed through the rear edge 122 of the base plate 114 separately or may define a single inner slot for the passage of the first and second inner strap members 152 and 154.

Specifically, the first inner strap member 152 is threaded through the cinch buckle 172 and includes a first or cinch end 180 (FIG. 1) and a second or latch end 182 (FIG. 2). Pulling on the cinch end 180 of the first inner strap member 152 pulls the first inner strap member 152 through the cinch buckle 172 to tighten the base plate 114 down on a vehicles passenger seat in a manner described in more detail herein below. The first inner strap member 152 further includes a latch or snap clip 184 provided on the latch end 182 for connecting the first inner strap member 152 to a latch anchor associated with a vehicles passenger seat to thereby secure the base plate 114 to the vehicles passenger seat.

Similarly, the second inner strap member 154 is threaded through the cinch buckle 174 and includes a first or cinch end 186, a second or latch end 188 and a latch or snap clip 190 which performs in an identical fashion to secure the second strap member 154 to a latch anchor of a vehicles passenger seat. Likewise, the first and second outer strap members 156 and 158 are threaded through the cinch buckles 176 and 178. The first outer strap member 156 includes a first or cinch end 192, a second or latch end 194 and a latch or snap clip 196 for securing the first outer strap member 156 to a latch anchor associated with a vehicles passenger seat. Likewise, the second outer strap member 158 includes a first or cinch end 198, a second or latch end 200 and a latch or snap clip 202 to similarly secure the second outer strap member 158, and thus the base plate 114, to a latch anchor associated with a vehicles passenger seat.

The base plate 114 may be provided with various other configurations or accommodations to account for and cooperate with various sized, shapes and features provided in different types of vehicles passenger seats. For example, the base plate 114 may include clearance slots 204, 206, etc. formed in the rear edge 122 of the base plate 114 to provide clearance for projecting seat belt buckles and latches (not shown) associated with a vehicles passenger seat to prevent the seat belt buckles and latches from hindering the use of the children's car seat adapter 100.

Figure 3:
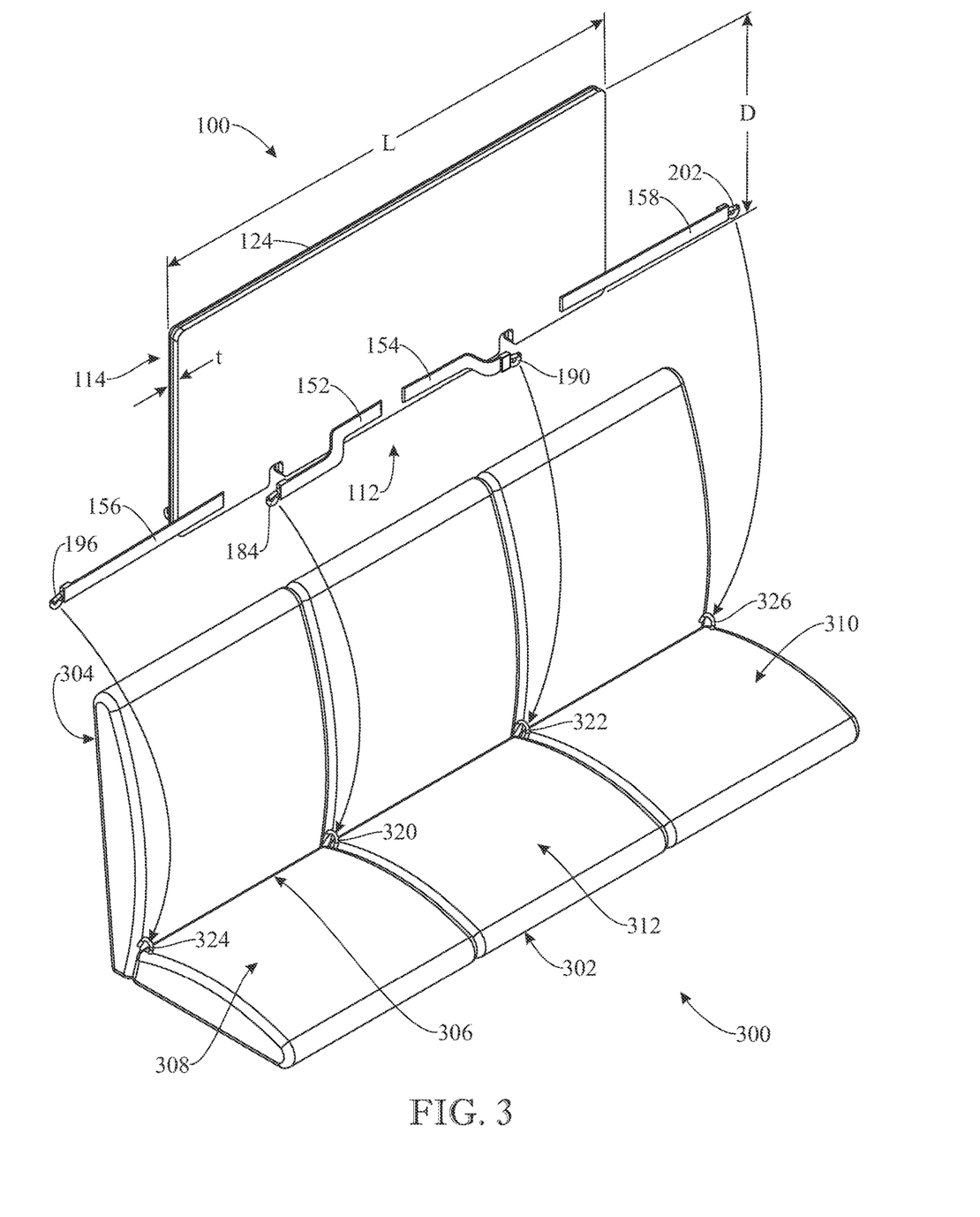
FIG. 3 presents a top, front isometric view of the children's car seat adaptor of the present invention in a position to be attached to child seat latch anchors located on a vehicles passenger seat.
Figure 4:
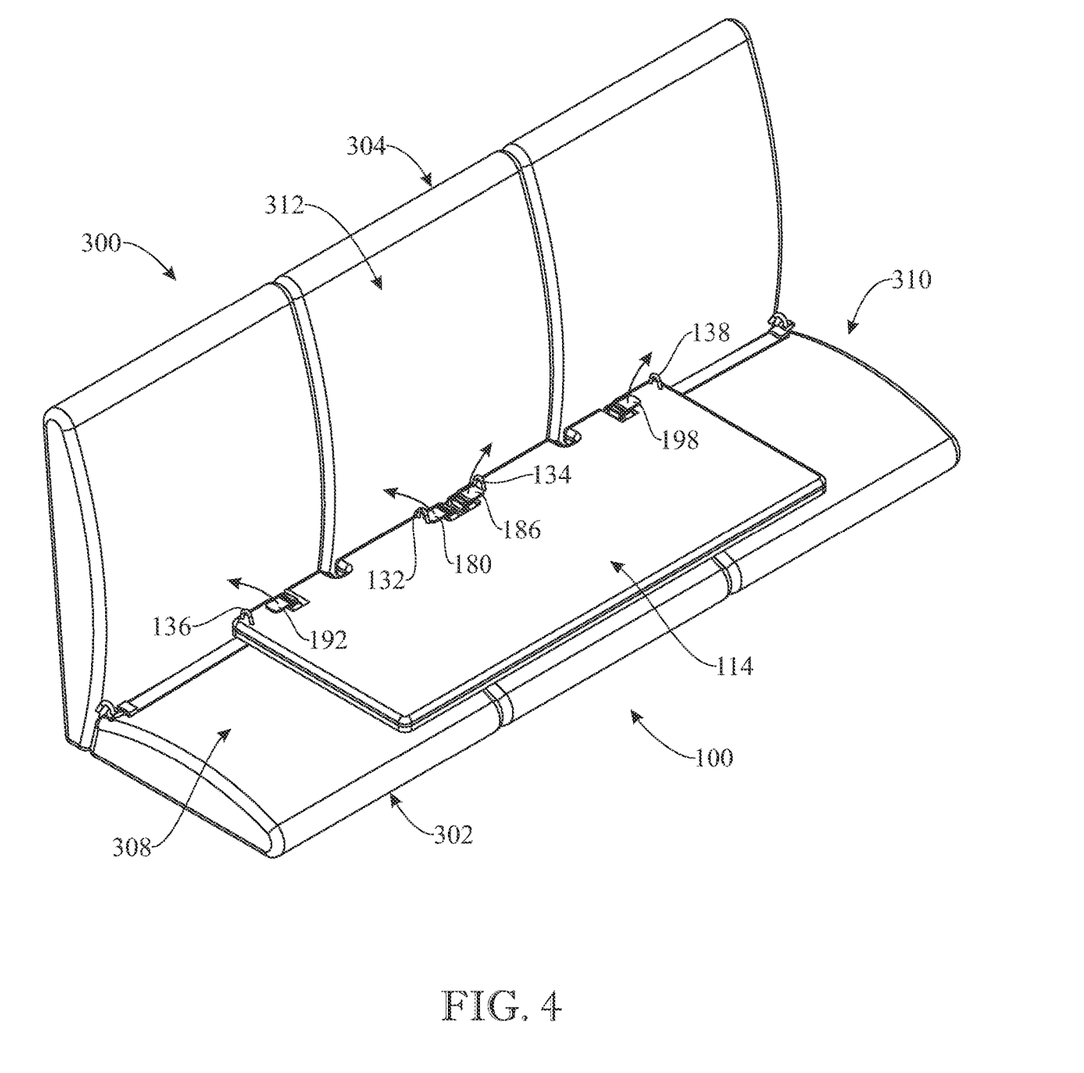
FIG. 4 presents a top, front isometric view of the children's car seat adaptor of the present invention installed in the middle of the vehicles passenger seat and affixed to the child seat latch anchors.

Turning now to FIGS. 1-7, and initially with regard to FIGS. 3 and 4, the use of the children's car seat adapter 100 to secure one or more children's car seats to a vehicles passenger seat 300 will now be described. The vehicles passenger seat 300 typically includes a horizontal cushioned base seat 302 and a vertical or upwardly extending back rest 302 extending upwardly from a rear edge 306 of the base seat 302. The passenger seat 300 illustrated is a rear vehicle bench style passenger seat 300 having a right side passenger seat 308 and a left side passenger seat 310. A central or center passenger seat area 312 is defined between the right and left side passenger seats 308 and 310, respectively.

In accordance with existing regulations, one or more latch anchors 320, 322, 324 and 326 are installed for use in securing a children's car seat in the right and left passenger seat areas 308 and 310. In existing situations, the children's car seats are attached to the right and left side passenger seats 308 and 310, using the latch anchors 320, 322, 324 and 326, positioning the children's car seats in the dangerous locations adjacent the side doors and exploding side impact air bags (not shown).

The disclosed children's car seat adapter 100 solves this dangerous situation by relocating the latch anchors, and thus the location of the attached children's car seats, to the safer location of the center passenger area 312. More specifically, it relocates a pair of children's car seats to the safer center passenger area 312.

The children's car seat adapter 100 is sized to fit over the base seat 302 of the vehicles passenger seat 300. In a preferred embodiment, the base plate 114 of the children's car seat adapter 100 has a width or length "L" of approximately 40 inches and a depth "D" of approximately 18 inches. In the disclosed embodiment, the base plate 114 of the children's car seat adapter 100 has a constant thickness "t" of one inch. In other embodiments, the thickness "t" of the base plate 114 may vary to account for variations in the base seat 302 of the vehicles passenger seat 300. Likewise, the front edge 124 of the base plate 114 need not be straight but may be shaped to conform to corresponding shapes of base seats 302.

In use, the children's car seat adapter 100 is positioned over the base seat 302 of the vehicle passenger seat 300 and the strap assembly 112 of the children's car seat adapter 100 is utilized to secure the children's car seat adapter 100 to the vehicle passenger seat 300. Specifically, the base plate 114 is positioned in a generally vertical orientation to expose and position the strap assembly 112 adjacent the rear edge 306 of the base seat 302 of the vehicle passenger seat 300. The respective latches or snap clips 184, 190, 196 and 202 of the first and second inner strap members 152 and 154 and the first and second outer strap members 156 and 158 are then secured or affixed to the latch anchors 320, 322 and 324, 326 of the vehicles passenger seat 300.

Referring to FIG. 4, once the base plate 114 has been attached to the vehicle passenger seat 300 with the strap assembly 112, the base plate 114 is folded down flat over the base seat 302 and tightened down securely against the base seat 302. Specifically, the first cinch ends 180, 186, 192 and 198 of the first and second inner strap members 152 and 154 and the first and second outer strap members 156 and 158 are pulled through their respective cinch buckles 172, 174, 176 and 178 to cinch or tighten the base plate 114 of the children's car seat adapter 100 securely down against and on top of the base seat 302 of the vehicle passenger seat 300. It may be useful when cinching the base plate 114 down on top of the base seat 302 to kneel down on or otherwise push down on the base plate 114 to compress the base plate 114 against the base seat 302 to remove any slack in the strap assembly 112 as the strap assembly 112 is being tightened down.

In this manner, the children's car seat adapter 100 is securely affixed to the vehicle passenger seat 300 and in a position to relocate one or two children's car seats to the safer center passenger area 312 within a vehicle. Specifically, the disclosed children's car seat adapter 100 positions the outer most latch anchors, the first and second outer latch anchors 136 and 138, substantially more inboard of the vehicles outer most latch anchors 324 and 326 to position a children's car seat in the safer center passenger area 312 of the vehicles passenger seat 300. It has been determined that children positioned in or near the center passenger area 312 have a 47% higher survivability rate than those positioned in the right or left passenger seats 308 and 310, respectively.

Figure 5:
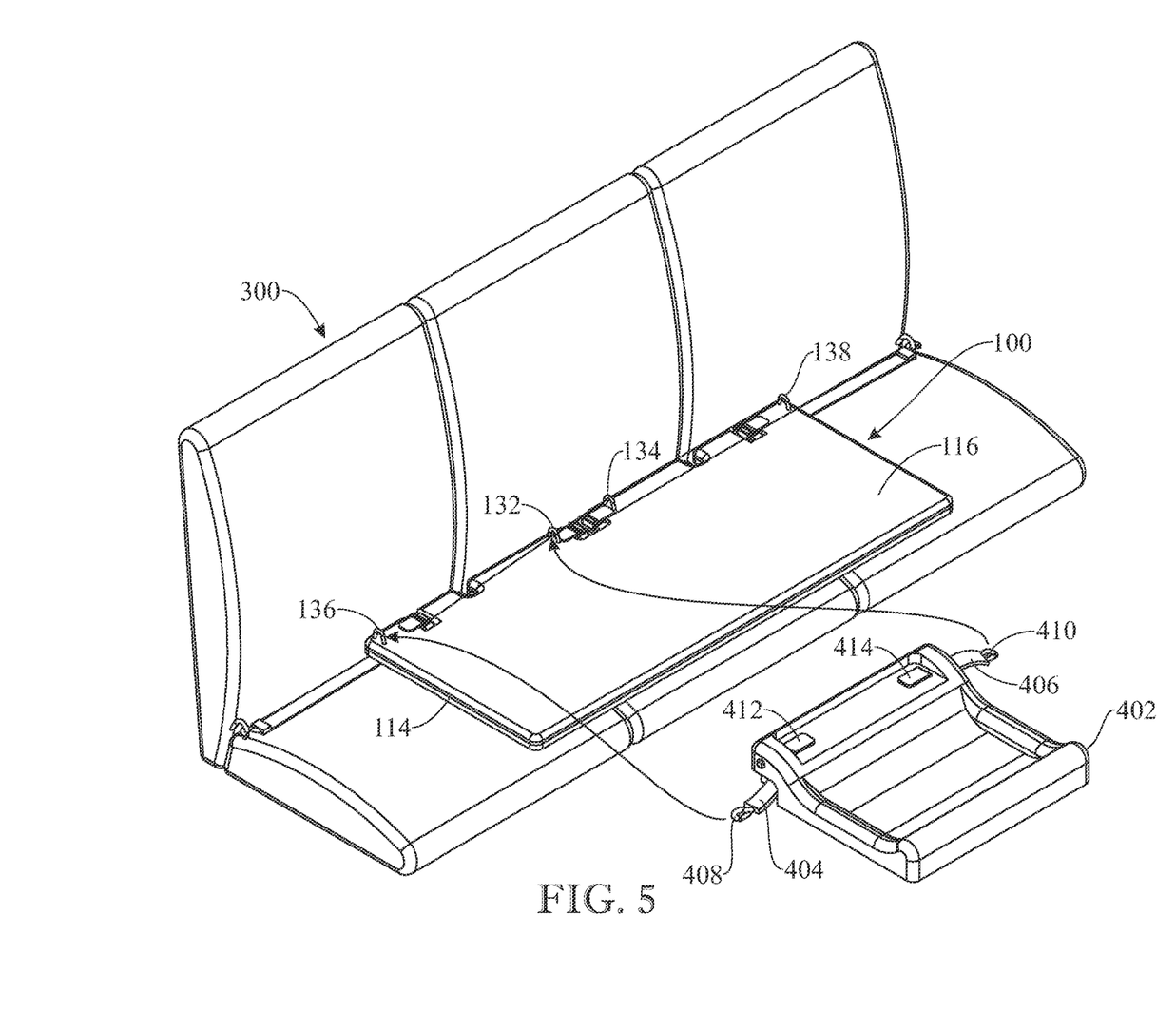
FIG. 5 presents a top, front isometric of the installed children's car seat adaptor with a base of a child's car seat being attached to adaptor latch anchors of the children's car seat adaptor.
Figure 6:
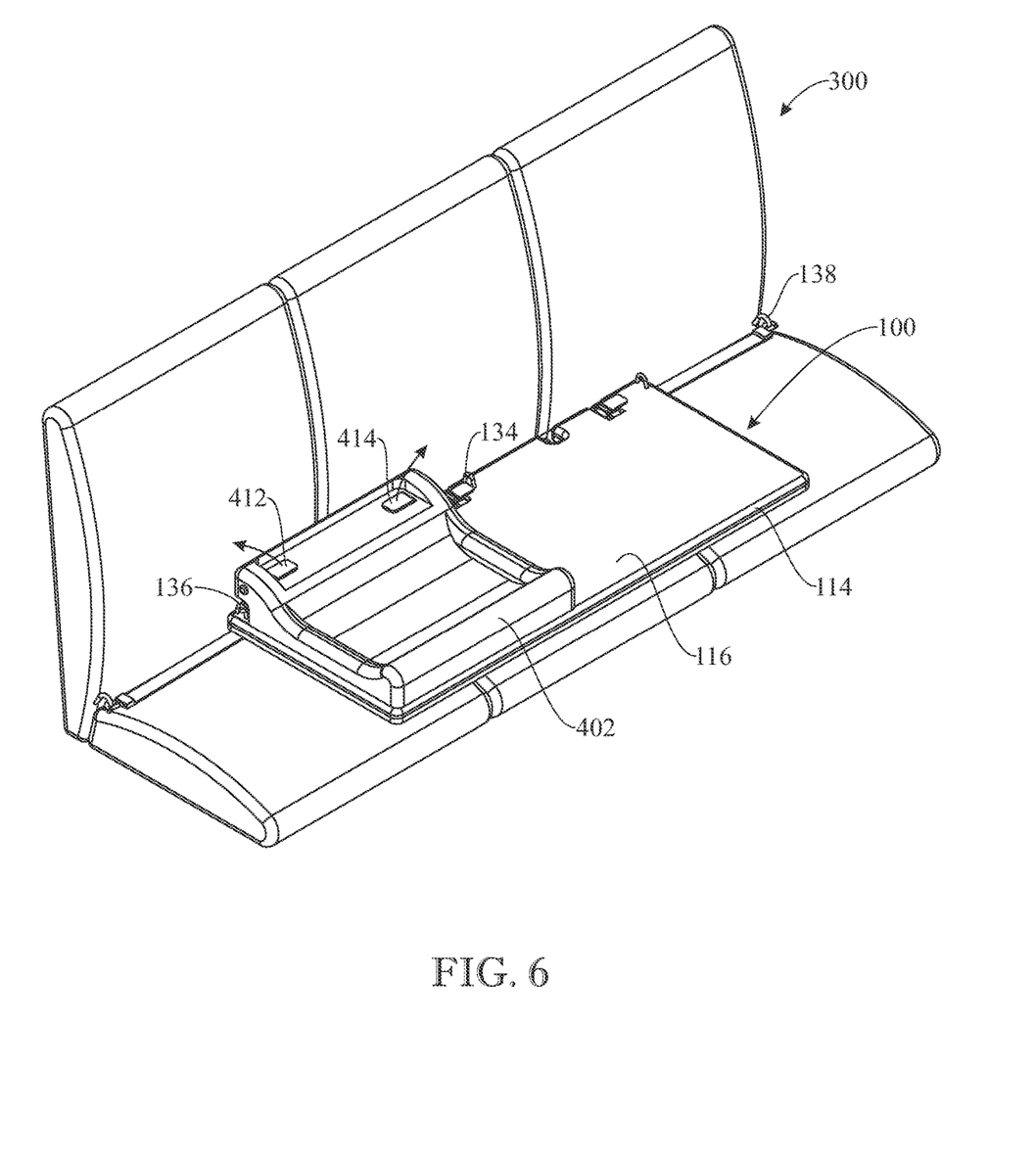
FIG. 6 presents a top, front isometric view of a child's car seat base secured to the disclosed children's car seat adaptor of the present invention.

Turning now to FIGS. 5 and 6, there is disclosed a seat base 402 of a first children's or child's car seat 400. The seat base 402 includes straps 404 and 406 extending from the seat base 402 and having respective latches 408 and 410 and cinch ends 412 and 414. To install the seat base 402 of the child's car seat 400, the seat base 402 is positioned on the top surface 116 of the base plate 114 of the children's car seat adapter 100 and located in the center passenger area 312 between the first inner latch anchor 132 and the first outer latch anchor 136. The latches 408 and 410 are then affixed to the first inner and outer latch anchors 132 and 136, respectively, in known manner.

Figure 7:
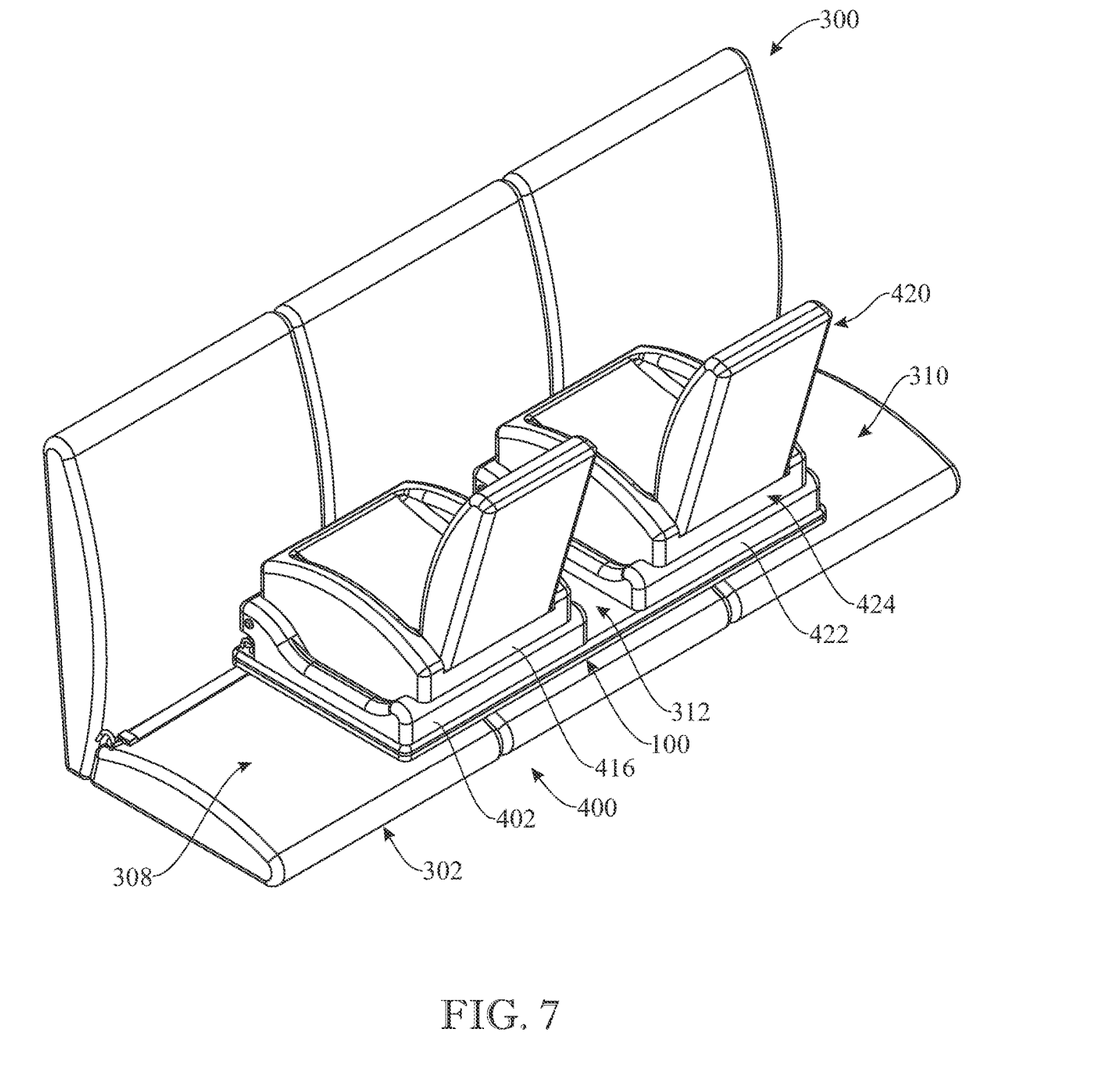
FIG. 7 is a presents a top, front isometric view of a pair of rearwardly facing child's car seats secured to the children's car seat adaptor of the present invention in the middle of the vehicles passenger seat.

Referring specifically to FIG. 6, once the latches 408 and 410 of the seat base 402 have been affixed to the first inner and outer latch anchors 132 and 136, the cinch ends 412 and 414 of the straps 404 and 406 are pulled tight to secure the child's car seat 400 agents the base plate 114 of the children's car seat adapter 100 in a manner similar to that described hereinabove for securing the base plate 114 against the seat base 302 of the vehicle passenger seat 300. With reference to FIG. 7, once the seat base 402 of the child's car seat 400 has been attached to the children's car seat adapter 100, a removable seat assembly 416 of the child's car seat 40 is snapped into or otherwise affixed in known manner to the seat base 402.

As shown in FIG. 7, the seat assembly 416 of the child's car seat 400 is in a rearward facing orientation on the children's car seat adapter and positioned in the safest area of the vehicle passenger seat 300 near the center passenger area 312 and away from the more dangerous right and left passenger seats 308 and 310, respectively. The seat assembly 416 may be repeatedly attached and removed from the seat base 402 of the first child's car seat 400 to accommodate the user and the child.

Should the user desire to reclaim the entire rear vehicle passenger seat for adult use, the seat base 402 is unlatched from the base plate 114 of the children's car seat adapter 100 and the children's car seat adapter 100 unlatched from the latch anchors 320, 322, 324 and 326 of the vehicle passenger seat 300.

As noted above, the disclosed children's car seat adapter 100 is specifically designed to accommodate and position two child car seats in the safer center passenger area 312 of a vehicle passenger seat 300. A second child's car seat 420 is affixed to the children's car seat adapter 100 in a manner identical to that of the first child's car seat 400 by securing a seat base 422 of the first child's car seat 420 with similar straps (not shown) of the second child's car seat 420 to the second inner and outer latch anchors 134 and 138 (FIG. 5) and cinching them down in identical fashion.

Thus, the disclosed children's car seat adapter 100 provides a needed device for locating one or two child's car seats 400 and 420 in the safest center passenger area 312 of a vehicle passenger seat and away from the more dangerous locations of the right and left passenger seats 308 and 310.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A children's car seat adapter for relocating a child's car seat to a safer center passenger area of a passenger seat of a motor vehicle, the children's car seat adapter comprising:
    a mounting platform having a base plate;
    a latch anchor assembly for receiving a child's car seat, the latch anchor assembly having first set of latch anchors affixed to said base plate and including a first inner latch anchor and a first outer latch anchor and a second set of latch anchors affixed to said base plate and including a second inner latch anchor and a second outer latch anchor; and a strap assembly affixed to the base plate for securing the base plate to a vehicles passenger seat, the strap assembly having:
- a first set of strap members including a first inner strap member and a first outer strap member, the first inner and outer strap members terminating in connectors attachable to latch anchors of a vehicles passenger seat; and
- a second set of strap members including a second inner strap member and a second outer strap member terminating in connectors attachable to latch anchors of a vehicle's passenger seat.

2. The car seat adapter of claim 1, wherein the base plate is formed of a polymeric material.

3. The car seat adapter of claim 1, wherein the base plate is rectangular in shape.

4. The car seat adapter of claim 1, wherein the base plate includes top surface and a bottom surface defining a rear edge, and further wherein the base plate further includes a front edge and a first and second side edges.

5. The car seat adapter of claim 4, wherein the base plate includes clearance slots formed in the rear edge.

6. The car seat adapter of claim 4, wherein the top surface of the base plate includes a textured surface configured to prevent the car seat from sliding on the base plate.

7. The car seat adapter of claim 4, wherein the bottom surface of the base plate includes a flexible covering configured to assist the base plate in conforming to any uneven surfaces on the passenger seat.

8. The car seat adapter of claim 4, wherein the base plate includes a rigid supporting member located adjacent the rear edge of the base plate.

9. The car seat adapter of claim 8, wherein the rigid supporting member is attached to the first and second sets of latch anchors.

10. The car seat adapter of claim 4, wherein the first and second inner and outer latch anchors are parallel to the first and second edge.

11. The car seat adapter of claim 4, wherein the first and second inner and outer latch anchors are parallel to the rear edge.

12. The car seat adapter of claim 1, wherein the strap assembly further includes cinch buckles associated with the first and second sets of strap members such that the first and second sets of strap members are threaded through the cinch buckles.

13. The car seat adapter of claim 12, wherein the cinch buckles are attached to the base plate.

14. The car seat adapter of claim 4, wherein the first and second sets of strap members pass through slots formed on the rear edge of the base plate.

15. The car seat adapter of claim 4, wherein the rear edge of the base plate includes clearance slots configured to provide clearance for projecting seat belt buckles and latches associated with the passenger seat.

16. The car seat adapter of claim 1, wherein the first and second set of latch anchors are fabricated from steel.

17. The car seat adapter of claim 1, wherein the first and second latch anchors have rounded corners.

18. A children's car seat adapter for relocating a child's car seat to a safer center passenger area of a passenger seat of a motor vehicle, the children's car seat adapter comprising:
- a mounting platform having a base plate, wherein the base plate includes top surface and a bottom surface defining a rear edge, and further wherein the base plate further includes a front edge and a first and second side edges;
- a latch anchor assembly for receiving a child's car seat, the latch anchor assembly having first set of latch anchors affixed to said base plate and including a first inner latch anchor and a first outer latch anchor and a second set of latch anchors affixed to said base plate and including a second inner latch anchor and a second outer latch anchor, wherein the first and second inner and outer latch anchors are parallel to the rear edge of the base plate; and
- a strap assembly affixed to the base plate for securing the base plate to a vehicles passenger seat, the strap assembly having:
  - a first set of strap members including a first inner strap member and a first outer strap member, the first inner and outer strap members terminating in connectors attachable to latch anchors of a vehicle's passenger seat; and
  - a second set of strap members including a second inner strap member and a second outer strap member terminating in connectors attachable to latch anchors of a vehicle's passenger seat.

19. A children's car seat adapter for relocating a child's car seat to a safer center passenger area of a passenger seat of a motor vehicle, the children's car seat adapter comprising:
- a mounting platform having a base plate, wherein the base plate includes top surface and a bottom surface defining a rear edge, and further wherein the base plate further includes a front edge and a first and second side edges;
- a rigid supporting member, the rigid supporting member located adjacent the rear edge of the base plate;
- a latch anchor assembly for receiving a child's car seat, the latch anchor assembly connected to the rigid supporting member and having first set of latch anchors affixed to said base plate and including a first inner latch anchor and a first outer latch anchor and a second set of latch anchors affixed to said base plate and including a second inner latch anchor and a second outer latch anchor, wherein the first and second inner and outer latch anchors are parallel to the rear edge of the base plate; and
- a strap assembly affixed to the base plate for securing the base plate to a vehicles passenger seat, the strap assembly having:
  - a first set of strap members including a first inner strap member and a first outer strap member, the first inner and outer strap members terminating in connectors attachable to latch anchors of a vehicle's passenger seat; and
  - a second set of strap members including a second inner strap member and a second outer strap member terminating in connectors attachable to latch anchors of a vehicle's passenger seat.

* * * * *